(12) United States Patent
Inoue et al.

(10) Patent No.: US 7,460,764 B2
(45) Date of Patent: Dec. 2, 2008

(54) APPARATUS FOR PROGRAMMING RECORDING OF TV PROGRAM AND/OR RADIO PROGRAM AND CONTROL METHOD THEREFOR

(75) Inventors: Kenji Inoue, Kanagawa (JP); Eiichi Matsuzaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1087 days.

(21) Appl. No.: 10/764,558

(22) Filed: Jan. 27, 2004

(65) Prior Publication Data
US 2004/0184776 A1    Sep. 23, 2004

(30) Foreign Application Priority Data
Jan. 29, 2003    (JP) .............. 2003-021025

(51) Int. Cl.
*H04N 5/91* (2006.01)
*G04B 19/24* (2006.01)

(52) U.S. Cl. .............................. 386/83; 386/46; 368/28

(58) Field of Classification Search .................. 386/83, 386/85, 46; 725/37, 47, 58, 61; 368/28
See application file for complete search history.

(56) References Cited

U.S. PATENT DOCUMENTS

| 6,266,295 | B1 * | 7/2001 | Parker et al. | 368/28 |
| 6,593,942 | B1 * | 7/2003 | Bushmitch et al. | 715/721 |
| 2003/0189674 | A1 | 10/2003 | Inoue et al. | 348/738 |

FOREIGN PATENT DOCUMENTS

| JP | 6-217219 | 8/1994 |
| JP | 7-193759 | 7/1995 |

* cited by examiner

Primary Examiner—Thai Tran
Assistant Examiner—Asher Khan
(74) Attorney, Agent, or Firm—Fitzpatrick, Cella, Harper & Scinto

(57) ABSTRACT

An apparatus for programming recording of a TV program and/or a radio program and a control method therefor performs displaying an analog clock; and displaying programmed recording information at a corresponding time position of the displayed analog clock in a superposed manner.

7 Claims, 19 Drawing Sheets

FIG. 15

| September | | | | | | |
|---|---|---|---|---|---|---|
| Sun | Mon | Tus | Wed | Thu | Fri | Sat |
| | 1 | 2 | 3 | 4 | 5 | 6 |
| 7 | 8 | 9 | 10 | 11 | 12 | 13 |
| 14 | 15 | 16 | 17 | 18 | 19 | 20 |
| 21 | 22 | 23 | 24 | 25 ← CURSOR | 26 | 27 |
| 28 | 29 | 30 | 31 | | | |

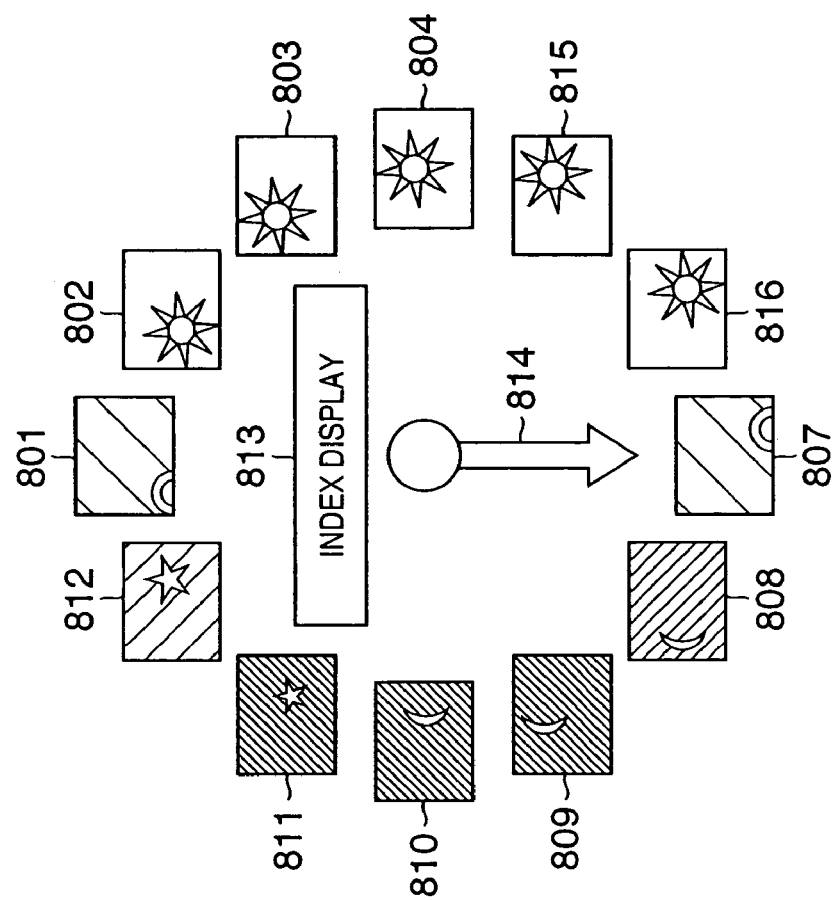

APPARATUS FOR PROGRAMMING RECORDING OF TV PROGRAM AND/OR RADIO PROGRAM AND CONTROL METHOD THEREFOR

FIELD OF THE INVENTION

The present invention relates to an apparatus for programming recording of a TV program and/or a radio program and a control method therefor.

BACKGROUND OF THE INVENTION

Two methods are mainly used for programming of a TV program. One is recording programming by a VCR (Video Cassette Recorder) or the like, and the other is on-timer programming of a TV receiver.

For recording programming of a VCR, various manufacturers employ various setting methods. As a general technique, the recording start time and end time are set. A method of preventing a time setting error is disclosed in, e.g., Japanese Patent Application Laid-Open Nos. 6-217219 and 7-193759.

These references disclose a technique for displaying a set time on an analog clock. This makes the set time easy to see.

On-timer programming is a function of automatically turning on a set channel at time set by the user. When the TV is in a sleep mode (the display and sound of the TV are OFF although the main power is ON), the TV is automatically powered on, and the set channel is turned on.

In on-timer programming, the time is generally set as a time interval from the current time. This is because the TV incorporates no timepiece function.

Most TVs incorporate only a subtracting timer that performs countdown for a predetermined time.

In both the VCR recording programming and on-timer programming, the set contents are displayed on the TV screen by character display called on-screen display (to be referred to as OSD hereinafter).

The above-described Japanese Patent Application Laid-Open Nos. 6-217219 and 7-193759 disclose a technique for making the set time easy to see but no technique for making the set contents themselves easy to see. The set contents displayed by OSD include a set time and channel number. When the user wants to confirm setting or contents of programming, he/she must separately recognize the set time and channel number.

This causes a programming error.

Especially, when a plurality of programs have been programmed to record, displaying the list of the pieces of programming information is insufficient for ensuring good visibility. It is also time-consuming to confirm the programming.

In digital broadcasting, the user can acquire program information. However, in the conventional list-type programming content display, the window display becomes complex if the program contents should also be displayed.

SUMMARY OF THE INVENTION

It is an object of the present invention to easily confirm the programming schedule to prevent any programming error.

In accordance with one aspect of the present invention, preferably, the foregoing object is attained by providing an apparatus for programming recording of a TV program and/or a radio program in accordance with an instruction of a user, comprising: a display unit adapted to display an analog clock; and a control unit adapted to display programmed recording information at a corresponding time position of the displayed analog clock in a superposed manner.

Other features and advantages of the present invention will be apparent from the following descriptions taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the descriptions, serve to explain the principle of the invention.

FIG. 15 is a view showing an example of a monthly programming confirmation window in the fourth embodiment;

FIG. 19 is a view showing an example of a window in an index display mode according to the sixth embodiment.

DETAILED DESCRIPTION OF THE PREFERRED EMBODIMENTS

First Embodiment

Figure 1:
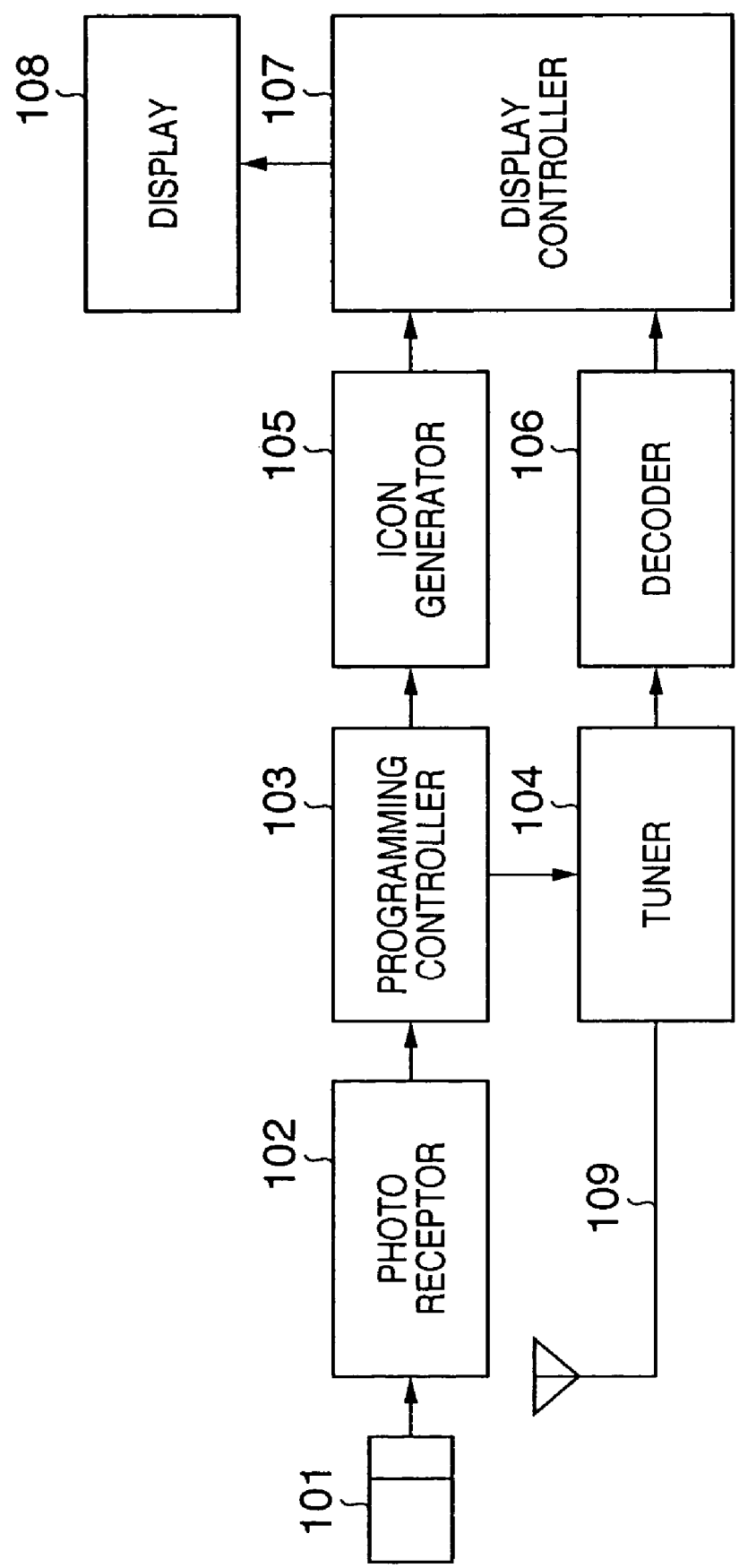
FIG. 1 is a block diagram showing the arrangement of a recording programming apparatus according to the first embodiment.

FIG. 1 is a block diagram showing the arrangement of a recording programming apparatus according to this embodiment. This recording programming apparatus records a received TV broadcast program and can program to record it.

This recording programming apparatus is merely an example to which the present invention is applied. The present invention can also be applied to a recording apparatus for recording, e.g., a radio broadcast program. That is, the present invention can be applied to an apparatus for recording a TV program and/or a radio program.

Reference numeral 101 denotes a remote control device; 102, a photoreceptor; 103, a programming controller; 104, a tuner; 105, an icon generator; 106, a decoder; 107, a display controller; 108, a display; and 109, an antenna.

The remote control device 101 converts a user instruction into optical data and transmits it to the photoreceptor 102.

The photoreceptor 102 converts the optical data into an electrical signal and sends it to the programming controller 103.

In accordance with the user instruction, the programming controller 103 outputs a tuning instruction to the tuner 104. When the user instructs programming, pieces of programming information such as a set time and channel are sent to the icon generator 105. In addition, the set time is measured. At the set time, the programming controller 103 outputs a tuning instruction to the tuner 104.

The icon generator 105 generates an icon of the programming information and sends the icon to the display controller 107.

The tuner 104 executes tuning in accordance with the tuning instruction and receives a broadcast wave from the antenna 109. The received data is sent to the decoder 106.

The decoder 106 decodes the received data and sends it to the display controller 107.

The display controller 107 constructs the display window in accordance with the display mode and sends the display data to the display 108. When the display mode is a normal watching mode, the received data from the decoder 106 is directly displayed. When the display mode is a programming setting mode, display data is generated on the basis of the icon from the icon generator 105.

The display 108 displays the display data sent from the display controller 107.

Figure 2:
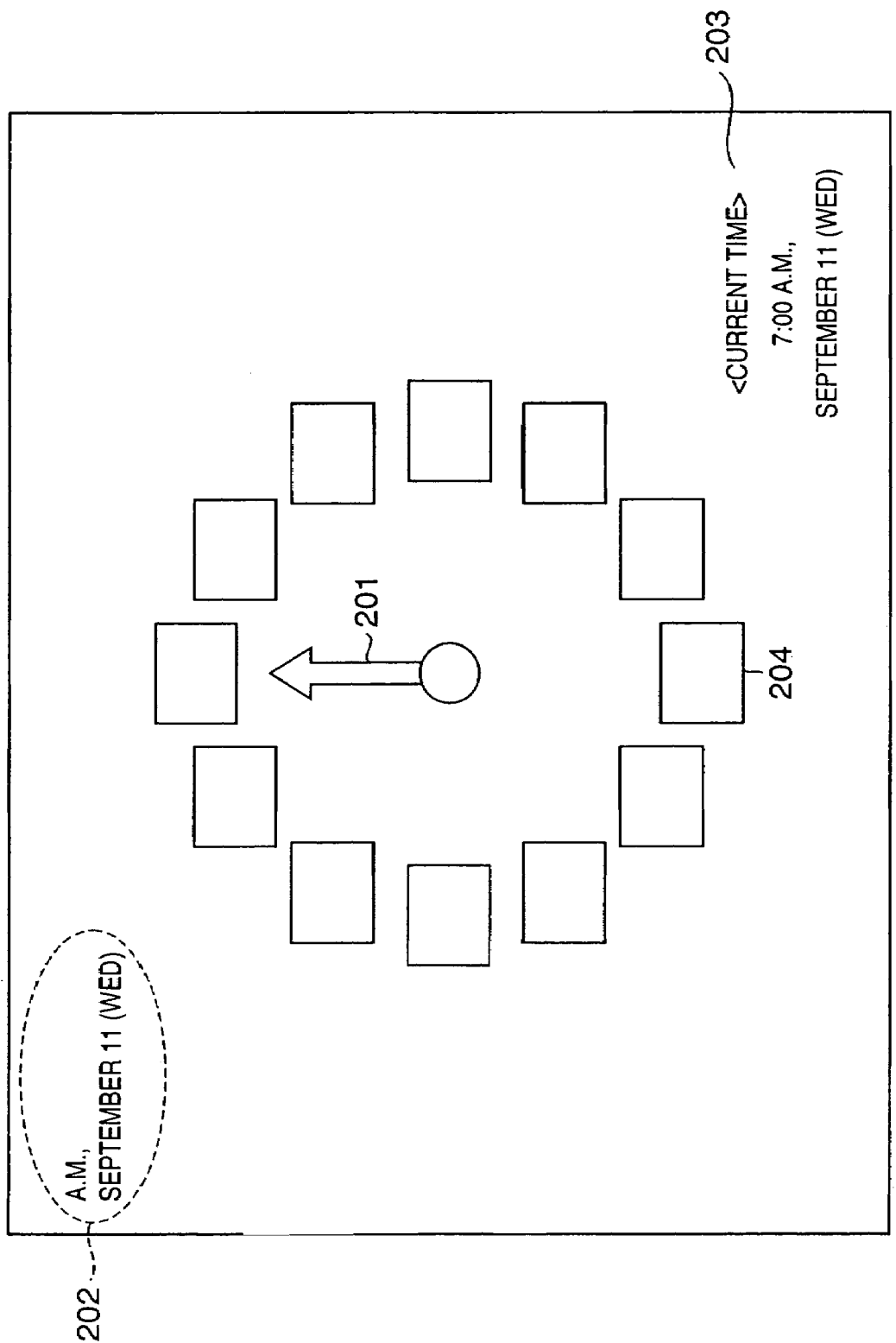
FIG. 2 is a view showing an example of a programming setting window.

FIG. 2 is a view showing an example of a programming setting window.

Reference numeral 201 denotes a programmed time indicator; 202, a date indicator; 203, a current time indicator; and 204, an icon.

The programmed time indicator 201 corresponds to the hour hand of an analog clock and indicates "12:00" in FIG. 2.

The date indicator 202 indicates a date when recording programming should be done. Since the analog clock indicator can normally express only 12 hrs, "a.m." or "p.m." is also indicated by the date indicator 202. Referring to FIG. 2, the date indicator 202 indicates "a.m., September 11 (Wed)".

The current time indicator 203 indicates the current date and time.

The icon 204 is generated by the icon generator 105. Twelve icons 204 are generated and arranged in correspondence with the number portions of the respective times on the analog clock. Since no programming is executed yet in FIG. 2, all the 12 icons 204 are blank.

That is, FIG. 2 shows a window in which the current time is "7:00 p.m., September 11 (Wed)", and the programming indicator indicates "12:00 a.m., September 11 (Wed)".

Figure 3:
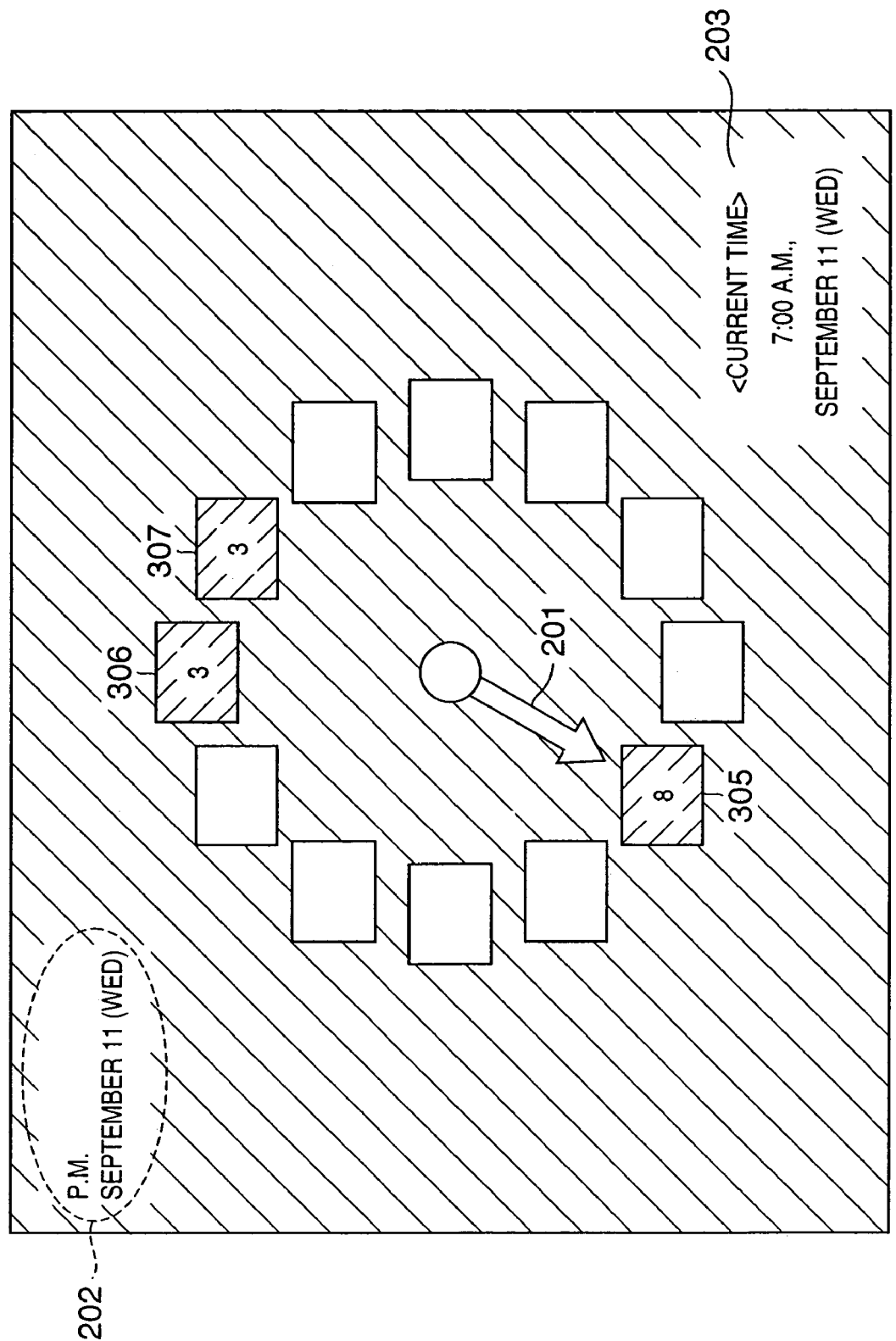
FIG. 3 is a view showing an example of the programming setting window when programming has already been done.

FIG. 3 is a view showing an example of the programming setting window when programming has already been done.

Referring to FIG. 3, the programmed time indicator 201 indicates 7:00. The date indicator 202 indicates "p.m., September 11 (Wed)". Hence, the time (programmed time) when recording should start in accordance with programming is "7:00 p.m., September 11 (Wed)". The display color of the dial is changed between "a.m." and "p.m." indicated by the date indicator 202, thereby increasing the visibility.

A programmed icon 305 represents a state wherein programming has already been completed. A programmed icon changes to a preset color. With this display, whether programming has already be done for the time can be determined at a glance. The programmed icon has a channel number of the tuner for scheduled recording.

The programmed icon 305 represents that programming has been done for "1 hr from 7:00 p.m., September 11 (Wed) on channel 8". As described above, the programmed channel can also be discriminated only by checking the icon.

Each of programmed icons 306 and 307 also indicates a state wherein programming has already been completed. The programmed icons 306 and 307 are located at the positions of 12:00 and 1:00, respectively. The same channel is programmed over two time zones adjacent to each other. This represents that programming for 2 hrs is set. Hence, the programmed icons 306 and 307 indicate that programming has been done for "2 hrs from 12:00 p.m., September 11 (Wed) on channel 3".

Figure 4:
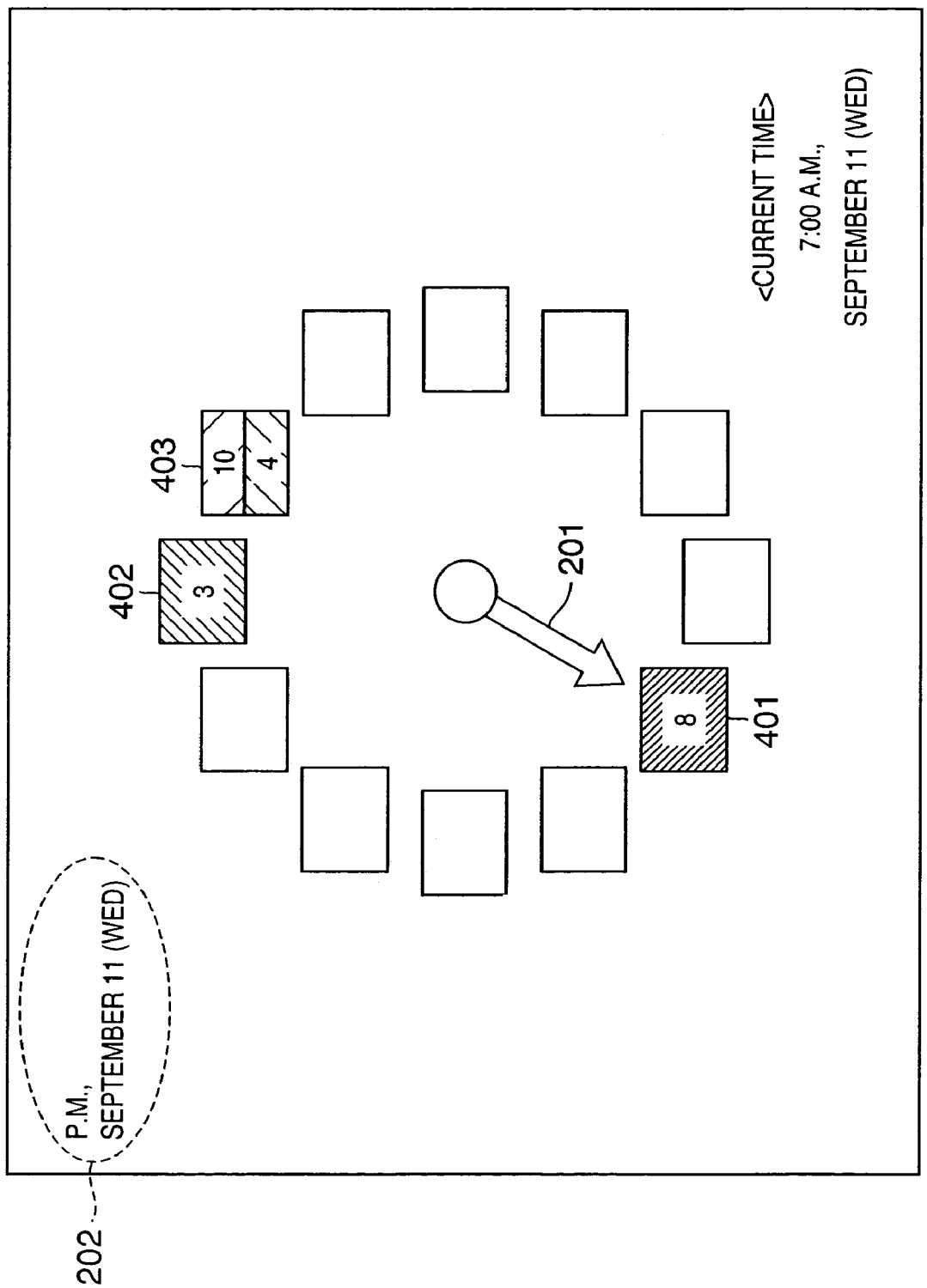
FIG. 4 is a view showing an example of the programming setting window that represents another programming state.

FIG. 4 is a view showing an example of the programming setting window that represents another programming state.

A programmed icon 401 represents programming for "channel 8 at 7:00 p.m." A programmed icon 402 represents programming for "channel 3 at 12:00 p.m." In this embodiment, the color for programming confirmation may be changed for each channel, as shown in FIG. 4. The colors can be set by the user in advance.

A programmed icon 403 has two, upper and lower layers, as shown in FIG. 4. Different numbers are indicated in the upper and lower layers. This represents two programming situations for "channel 10 from 1:00 p.m. to 1:30 p.m." and "channel 4 from 1:30 p.m. to 2:00 p.m." When an icon having a multilayered structure is used, programming for every 30 min or every 15 min also becomes possible.

Figure 5:
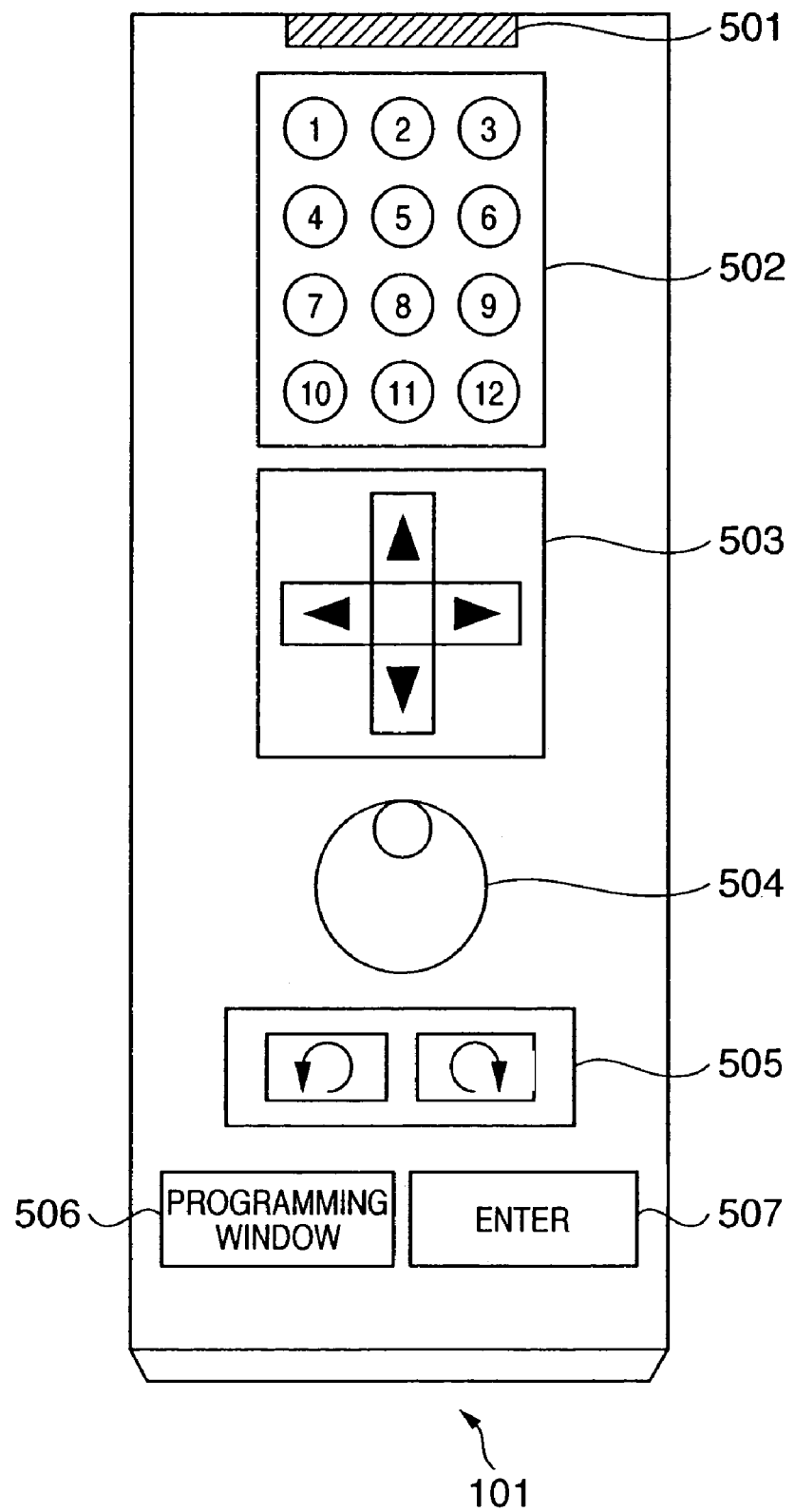
FIG. 5 is a view showing an example of a remote control device according to the embodiment.

FIG. 5 is a view showing an example of the remote control device 101.

Reference numeral 501 denotes a phototransmitter, 502, numeric keys; 503, cursor keys; 504, a dial; 505, rotating keys; 506, a programming window key; and 507, an enter key.

The phototransmitter 501 transmits, as optical data, the instruction contents of the remote control device 101 by the user operation to the photoreceptor 102.

The numeric keys 502 are mainly used to select a channel. On the programming setting window, the numeric keys 502 may be used as programmed time selection keys, i.e., means for directly inputting time.

The cursor keys 503 are mainly used to adjust the sound volume or select a channel. On the programming setting window, the cursor keys 503 may be used to move the cursor or as programmed time selection keys.

The dial 504 is used as a programmed time selection dial on the programming setting window. When this dial is rotated, the programmed time indicator 201 on the programming setting window described in FIG. 2 or 3 rotates like the hour hand of a clock so that the user can select desired time.

The rotating keys 505 are used as programmed time selection keys on the programming setting window. When these keys are pressed, the programmed time indicator 201 on the programming setting window described in FIG. 3 rotates like the hour hand of a clock so that the user can select desired time. When the key on the left side is pressed, the indicator rotates clockwise.

When the key on the right side is pressed, the indicator rotates counterclockwise.

The operation on the programming setting window can be implemented by one or a plurality of keys.

The programming window key 506 switches the display mode. In the watching mode, a received program is displayed (program watching window). In programming setting mode, the programming setting window is displayed. Every time this key is pressed, the program watching window and programming setting window are switched.

The enter key 507 decides setting on the programming setting window. When time and channel are selected by the keys 501 to 503 and 505 or the dial 504, and the enter key 507 is pressed, the selected time and channel are decided.

Figure 6:
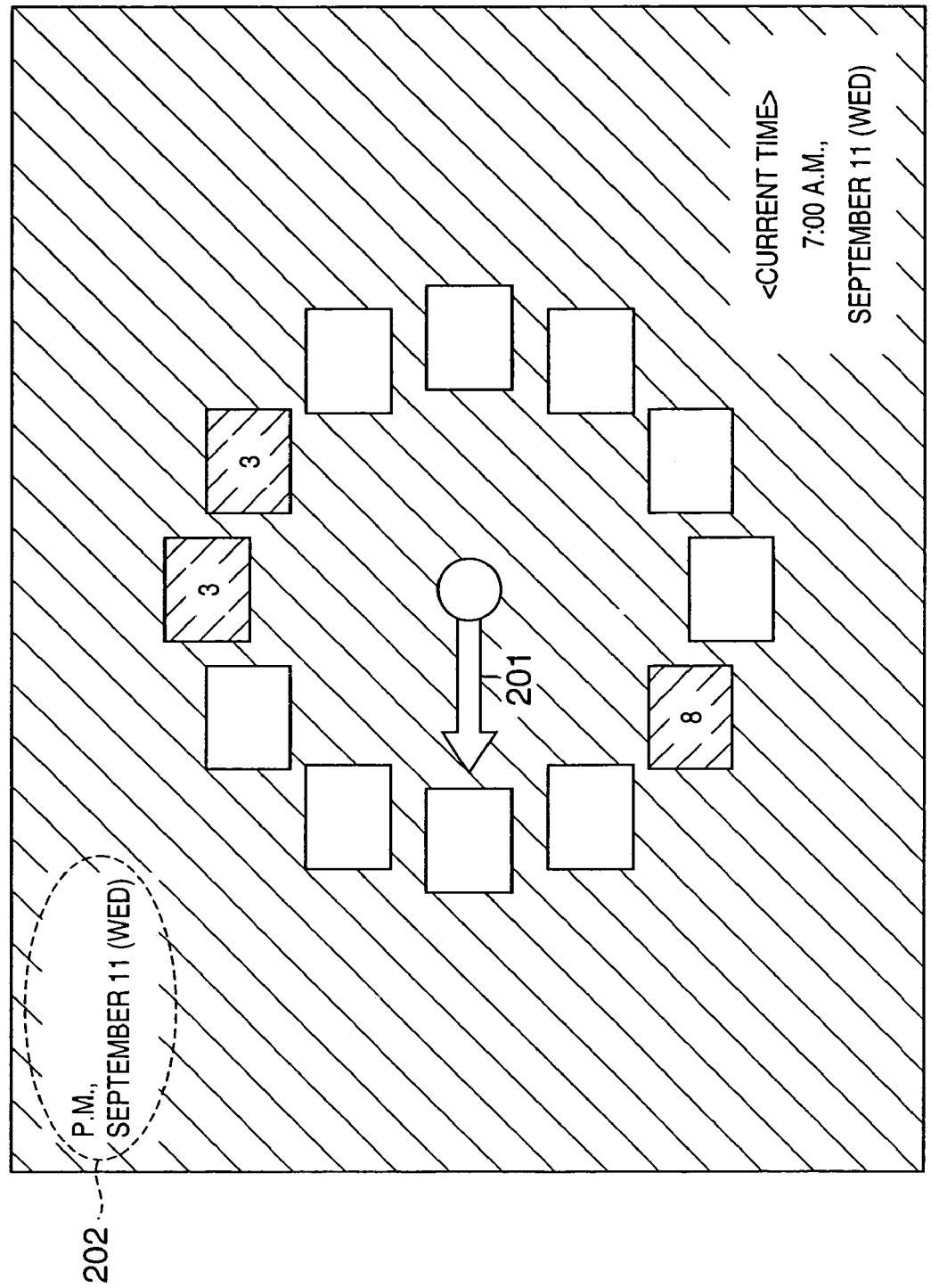
FIGS. 6 and 7 are views showing examples of the programming setting window according to the first embodiment.
Figure 7:
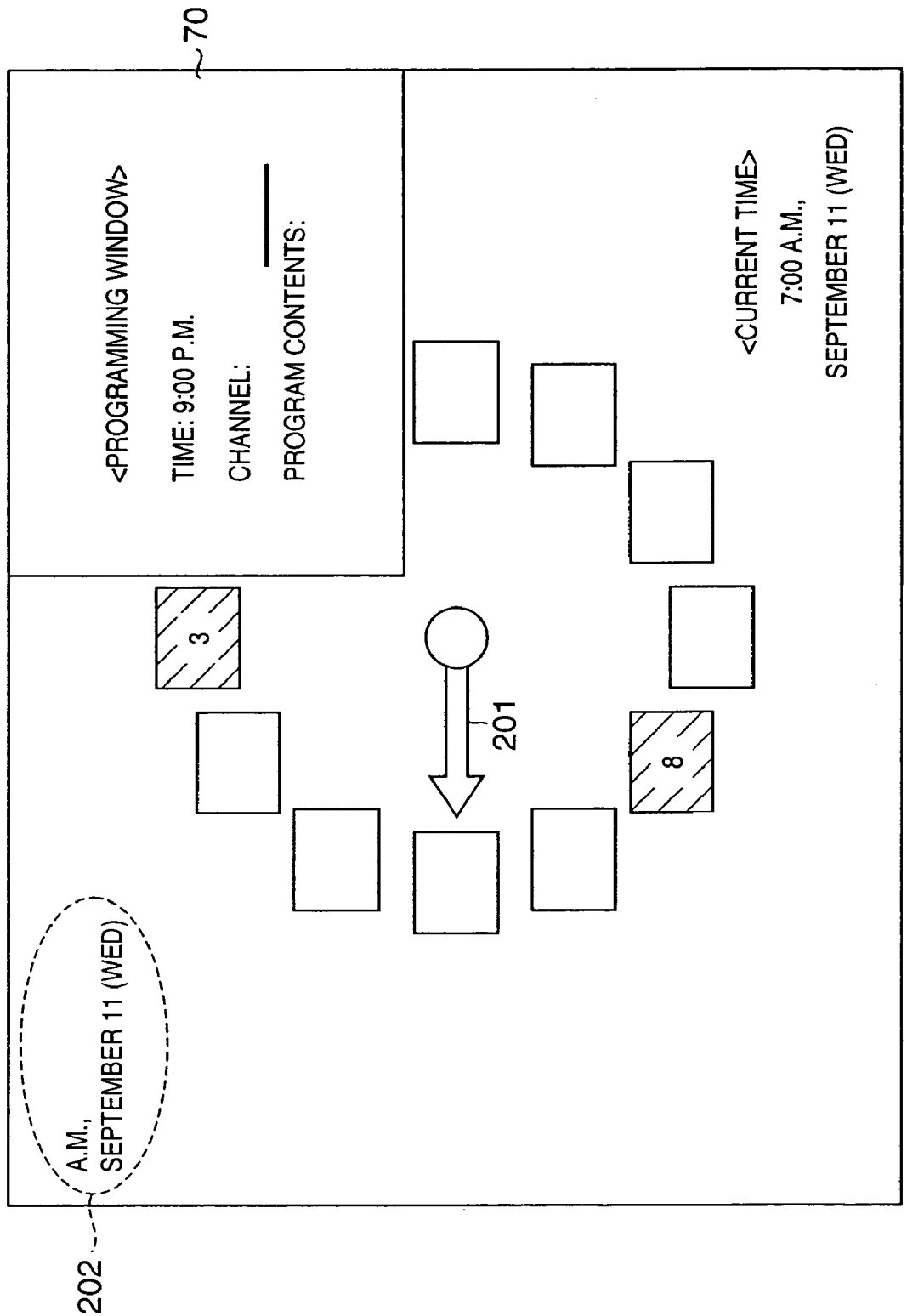

FIGS. 6 and 7 show examples of the programming setting window in actual programming.

When a user who is watching TV broadcasting presses the programming window key 506, the program watching window switches to the programming setting window shown in FIG. 2.

The time indicator 201 and date indicator 202 are operated by the remote control device 101 to indicate the desired date/time for programming.

Assume that the user wants to make programming at "9:00 p.m., September 11 (Wed)", as shown in FIG. 6.

Even for programming for 9:15 or 9:30, the programmed time indicator is set to the position of 9:00.

When the enter key 507 is pressed, the window shown in FIG. 7 is displayed to open a programming window 70. Finer time setting and channel setting are done on the programming window 70. When program information can be acquired like digital broadcasting, the program contents can also be displayed in the programming window. The size and display position of the programming window can be set by the user in advance. Full screen display can also be done by setting.

According to the above-described first embodiment, the programmed time indicator 201 corresponding to the hour hand of an analog clock indicates the programmed time. Programmed recording information (e.g., the channel number) is displayed at the position of the programmed time on the analog clock. Accordingly, the user can confirm the programmed time and other information related to that programming at a glance.

Second Embodiment

In this embodiment, an example of a programming setting window when the apparatus incorporates no timepiece function will be described.

Figure 8:
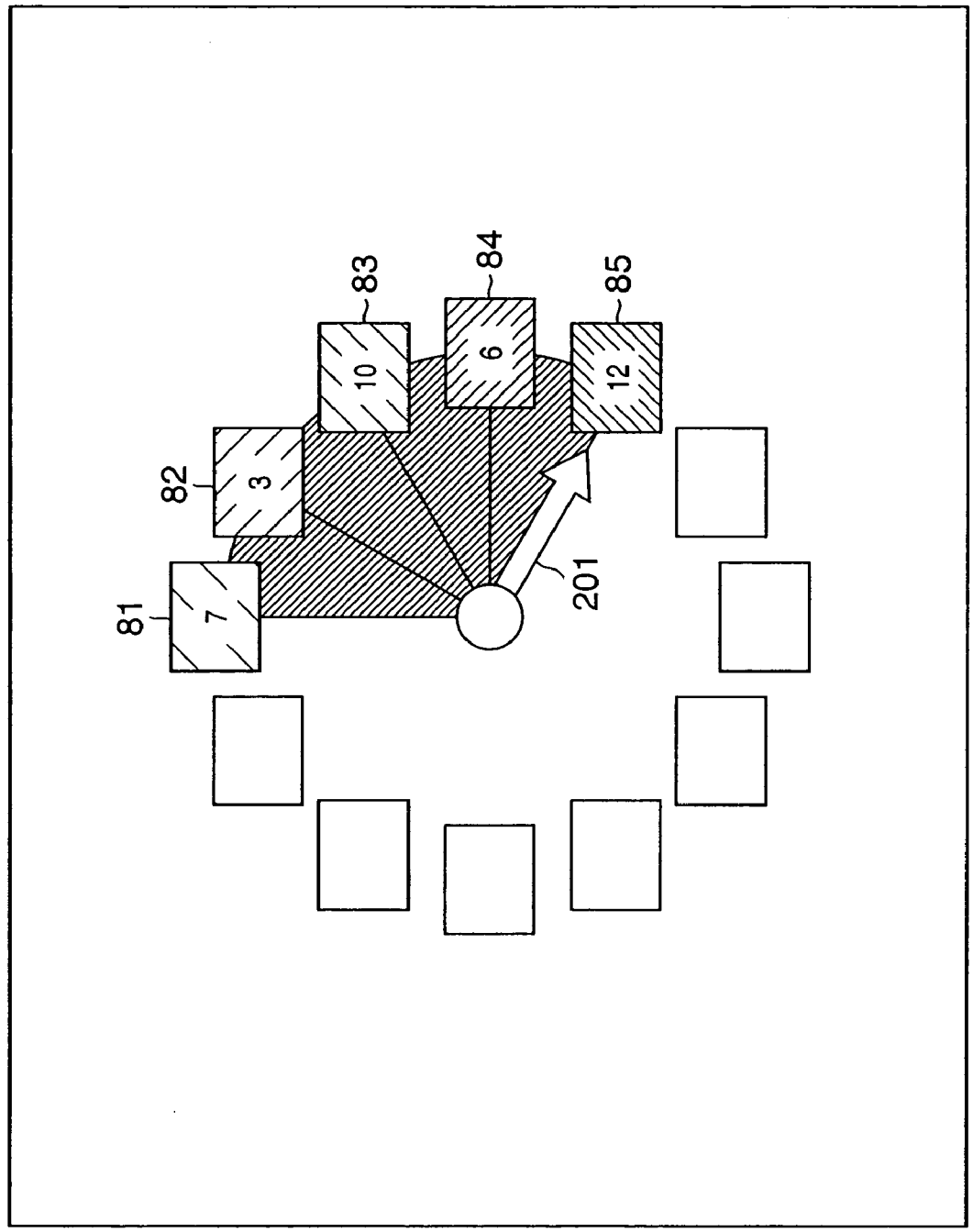
FIG. 8 is a view showing an example of a programming setting window according to the second embodiment.

FIG. 8 is a view showing an example of the programming setting window according to the second embodiment.

In this example, since the apparatus incorporates no timepiece function, only on-time programming by a subtracting timer is possible. In on-time programming, the start point is set at 12:00 on the analog clock.

An icon 81 at the position of 12:00 indicates the number of channel currently received by the tuner. An icon 82 at the position of 1:00 indicates the programming contents (channel number) after 1 hr from the current time. An icon 83 at the position of 2:00 indicates the programming contents (channel number) after 2 hrs from the current time. An icon 84 at the position of 3:00 indicates the programming contents (channel number) after 3 hrs from the current time. An icon 85 at the position of 4:00 indicates the programming contents (channel number) after 4 hrs from the current time.

That is, the window shown in FIG. 8 represents that "channel 7 is currently being received, channel 3 is programmed 1 hr later, channel 10 is programmed 2 hrs later, channel 6 is programmed 3 hrs later, and channel 12 is programmed 4 hrs later". At this time, the time zones with programming are distinguished by colors so that the user can know the time zones with programming at a glance. In addition, the color of programmed icon is changed for each programmed channel to increase the visibility. This programming setting allows to make a program recording schedule 11 hrs in advance.

Figure 9:
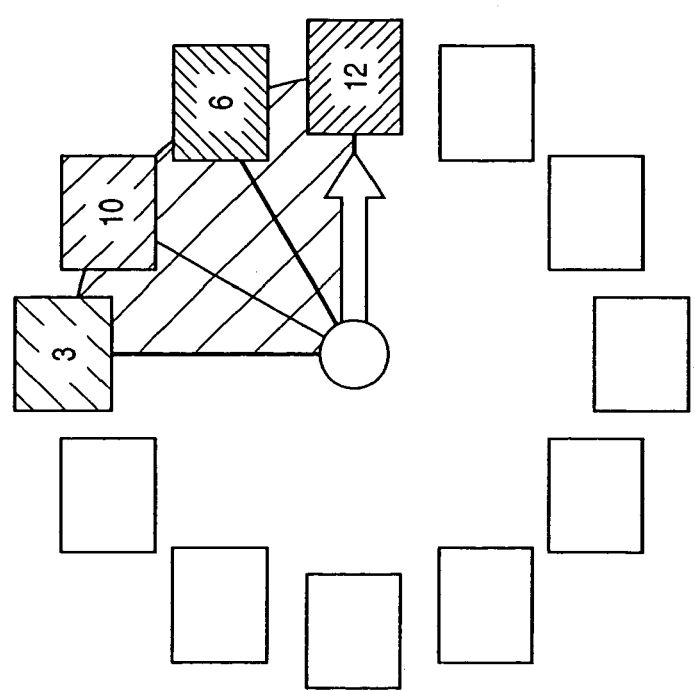
FIG. 9 is a view showing the programming setting window 1 hr after the time of the programming state shown in FIG. 8.

FIG. 9 is a view showing the programming setting window 1 hr after the time of the programming state shown in FIG. 8.

Since 1 hr has elapsed, the current reception channel (channel 7) changes to channel 3 that is programmed. Accordingly, the programming times are sequentially shifted toward the start point (the position of 12:00).

Even in on-time programming, the programming setting window display of this embodiment can express the programmed channel and time.

Third Embodiment

In this embodiment, a case wherein the apparatus has a plurality of tuners and a case wherein program information can be acquired in digital broadcasting will be described.

Figure 10:
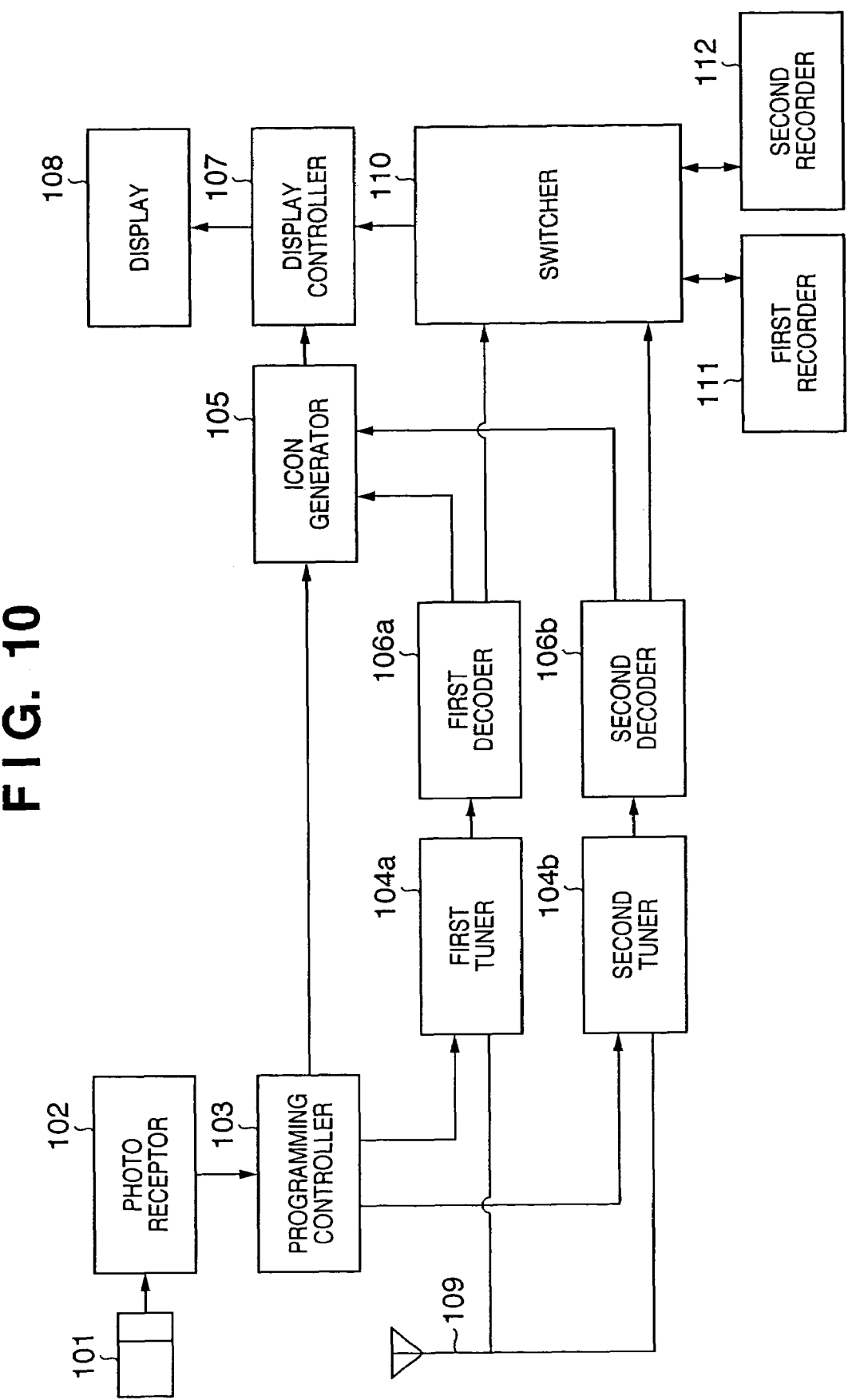
FIG. 10 is a block diagram showing the arrangement of a recording programming apparatus according to the third embodiment.

FIG. 10 is a block diagram showing the arrangement of a recording programming apparatus according to this embodiment. The same reference numerals as in the recording programming apparatus according to the first embodiment shown in FIG. 1 denote the same constituent elements in FIG. 10, and a description thereof will be omitted. Different constituent elements will be described below.

The recording programming apparatus shown in FIG. 10 has first and second tuners 104a and 104b connected to a programming controller 103. The first and second tuners 104a and 104b are connected to first and second decoders 106a and 106b, respectively. The outputs from the first and second decoders 106a and 106b are connected to an icon generator 105 and switcher 110. First and second recorder 111 and 112 are connected to the switcher 110. The output from the switcher 110 is connected to a display controller 107.

The first tuner 104a executes tuning in accordance with a tuning instruction and receives a broadcasting wave from an antenna 109. The received data is sent to the first decoder 106a.

The second tuner 104b also executes tuning in accordance with a tuning instruction and receives a broadcasting wave from the antenna 109. The received data is sent to the second decoder 106b.

Each of the first and second decoders 106a and 106b decodes the input received data and sends the decoded data to the switcher 110. When program information is acquired, it is sent to the icon generator 105.

The icon generator 105 generates an icon of programming information. When program information is acquired from the first decoder 106a or second decoder 106b, an icon is generated for the combination of the program information and programming information. A thus generated icon is sent to the display controller 107.

In accordance with a user instruction from a remote control device 101, the switcher 110 selectively outputs the received data from the first and second decoders 106a and 106b to one of the display controller 107, first recorder (e.g., a VCR) 111, and second recorder (e.g., a hard disk recorder) 112. In this embodiment, since two tuners and two recorders are present, some switching patterns can be realized by the switching operation of the switcher 110.

Figure 11:
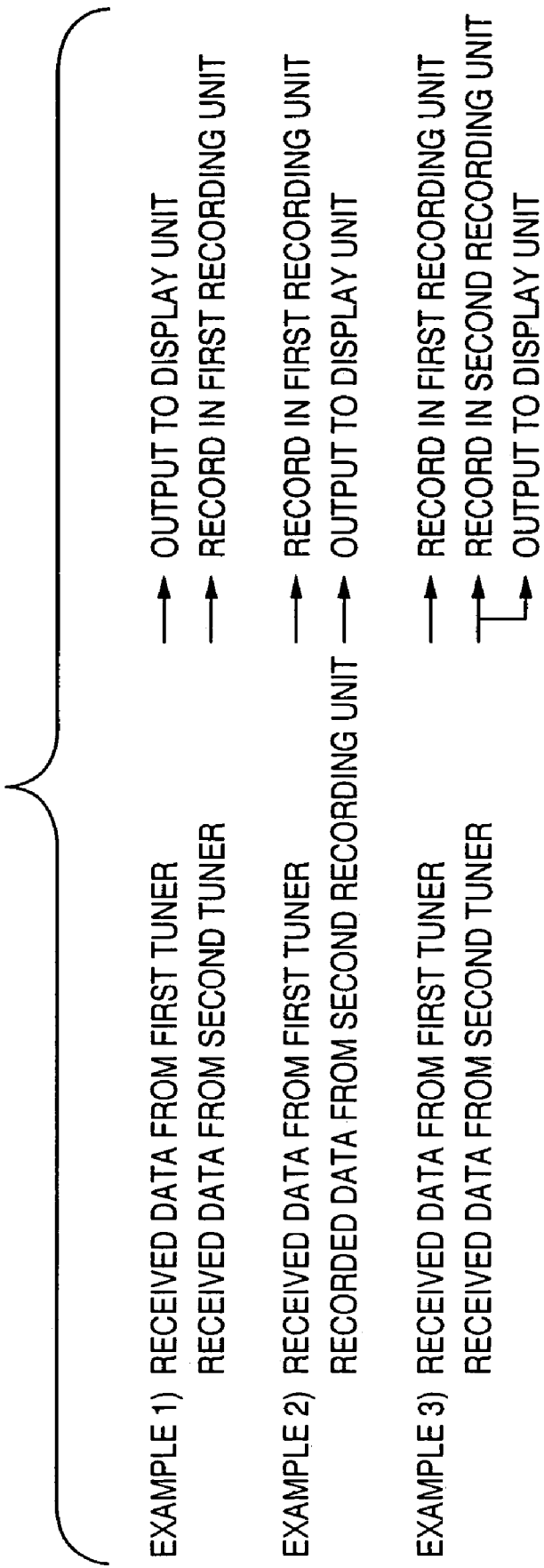
FIG. 11 is a view showing examples of switching patterns by a switcher according to the third embodiment.

FIG. 11 shows examples of switching patterns by the switcher 100.

In Example 1, switching control is executed such that received data from the first tuner 104a is output to the display 108 through the display controller 107 while received data from the second tuner 104b is output to the first recorder 111.

In Example 2, switching control is executed such that received data from the first tuner 104a is output to the first recorder 111 while recorded data from the second recorder 112 is output to the display 108 through the display controller 107.

In Example 3, switching control is executed such that received data from the first tuner 104a is output to the first recorder 111 while received data from the second tuner 104b is output to the second recorder 112 and also output to the display 108 through the display controller 107.

Various combinations are available in addition to the above-described examples.

The display controller 107 constructs the display window in accordance with the display mode and sends the display data to the display 108. When the display mode is a normal watching mode, the received data from the switcher 110 is directly displayed. When the display mode is a programming setting mode, display data is generated on the basis of the icon from the icon generator 105.

The display 108 displays the display data sent from the display controller 107.

Figure 12:
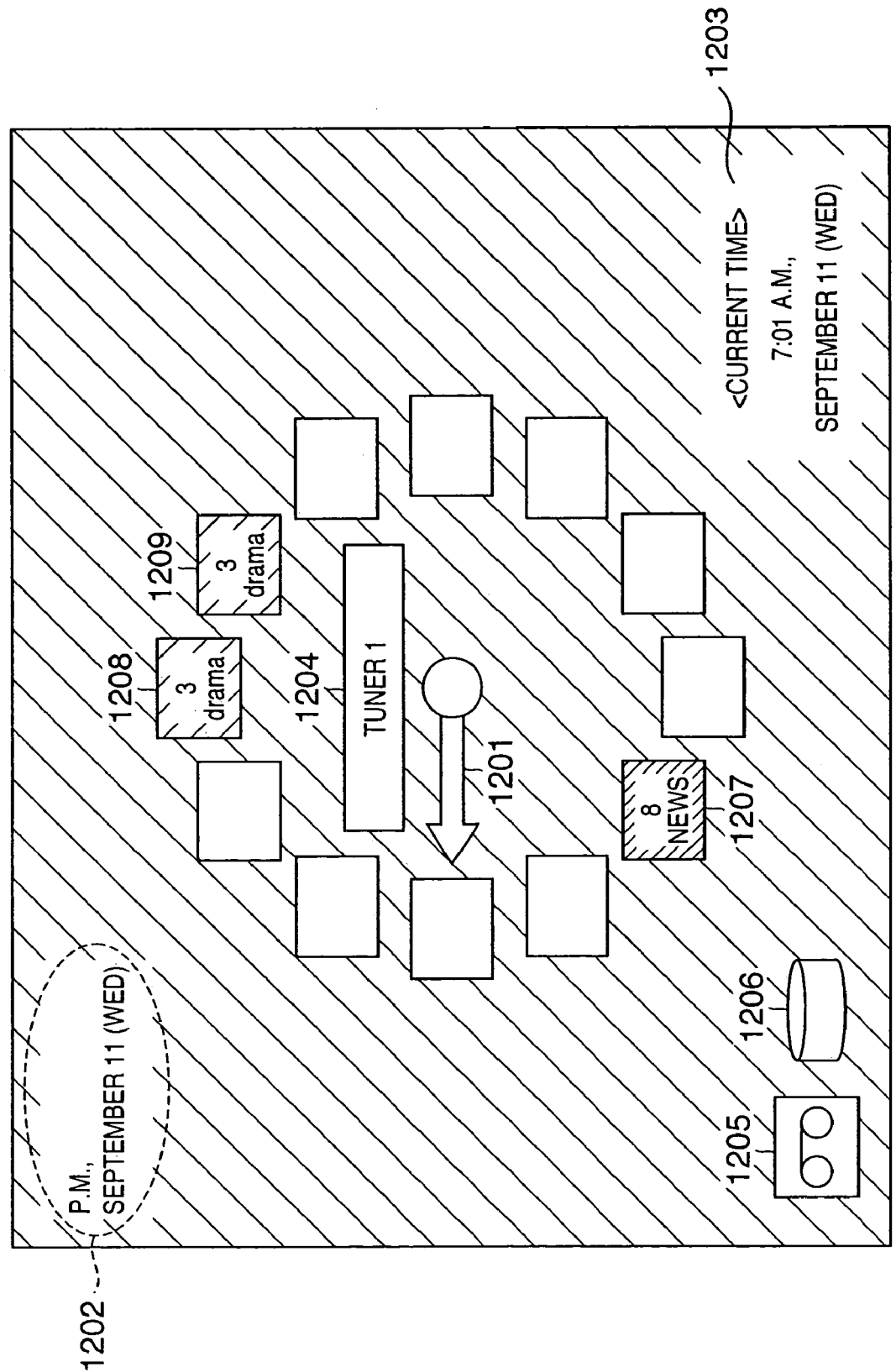
FIG. 12 is a view showing an example of a programming setting window according to the third embodiment.

FIG. 12 is a view showing an example of the programming setting window according to this embodiment.

Reference numeral 1201 denotes a programmed time indicator; 1202, a date indicator; 1203, a current time indicator; 1204, a tuner indicator; 1205, a first recorder icon; 1206, a second recorder icon; 1207, a programmed icon; and 1208, a programmed icon.

The programmed time indicator 1201 represents the hour hand of an analog clock and indicates "9:00" in FIG. 12.

The date indicator 1202 represents a date for programming. Referring to FIG. 12, the date indicator indicates "a.m., September 11 (Wed)".

The current time indicator 1203 indicates the current date and time and "7:01 a.m., September 11 (Wed)" in FIG. 12.

The tuner indicator 1204 indicates the tuner that is currently selected. Referring to FIG. 12, "tuner 1" is displayed, which indicates that the first tuner 104a is selected.

The first recorder icon 1205 and second recorder icon 1206 indicate the types of recorder. Referring to FIG. 12, the first recorder icon 1205 indicates the VCR 111, and the second recorder icon 1206 indicates the hard disk recorder 112. These icons are set in advance and can be selected by the user when a recorder is connected. When device connection is done by an interface such as IEEE 1394 that can transmit/receive device information, the icon may be selected automatically.

The programmed icon 1207 is generated by the icon generator 105. The icon generator 105 generates the programmed icon 1207 on the basis of the programming information from the programming controller 103 and the program information from the first decoder 106a or second decoder 106b. Referring to FIG. 12, the programmed icon 1207 indicates information "channel 8 is programmed at 7:00 p.m.; genre is "news"". The icon generator 105 reads the genre of the program from the program information and generates the icon. The genre is indicated by character information in FIG. 12.

However, it may be indicated by graphic information selectable by the user in advance.

The programmed icons 1208 and 1209 are also generated by the icon generator 105. Referring to FIG. 12, the programmed icons 1208 and 1209 indicate information "channel 3 is programmed from 12:00 p.m. to 1:00 p.m.; genre is "drama"".

Figure 13:
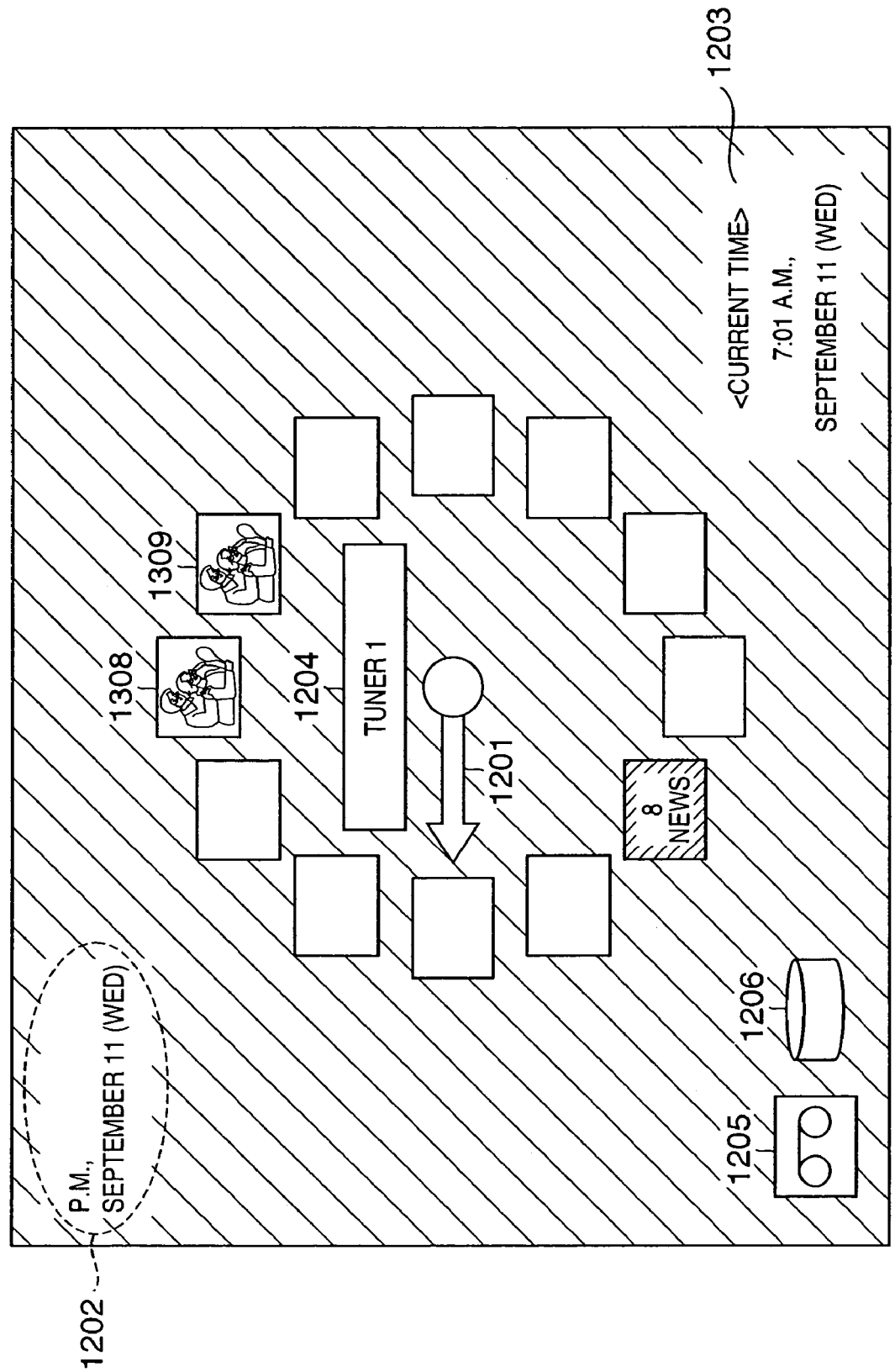
FIG. 13 is a view showing an example of the programming setting window in another form according to the third embodiment.

FIG. 13 is a view showing an example of the programming setting window in another form according to this embodiment.

FIG. 13 shows a window after the elapse of 8 hrs from the time of the programming setting window shown in FIG. 12. That is, it is a window after the programming of the programmed icon 1208, which has been done at the time shown in FIG. 12, is executed. The current time indicator indicates "3:01 p.m." in FIG. 13. That is, eight hrs have elapsed from "7:01 a.m." in FIG. 12. Accordingly, the programmed icons 1208 and 1209 change to recorded icons 1308 and 1309.

The recorded icons 1308 and 1309 are also generated by the icon generator 105. The recorded icons 1308 and 1309 may be indicated by either character information such as "recorded" or graphic information registered in advance. When the device used for recording is a device such as a hard disk recorder capable of random scan, a scene corresponding to several seconds of the start of the program may be used as a moving image icon.

Fourth Embodiment

This embodiment allows browsing the list of programming contents for one week or one month. An affangement in which program watching and programming confirmation can simultaneously be executed will also be disclosed.

Figure 14:
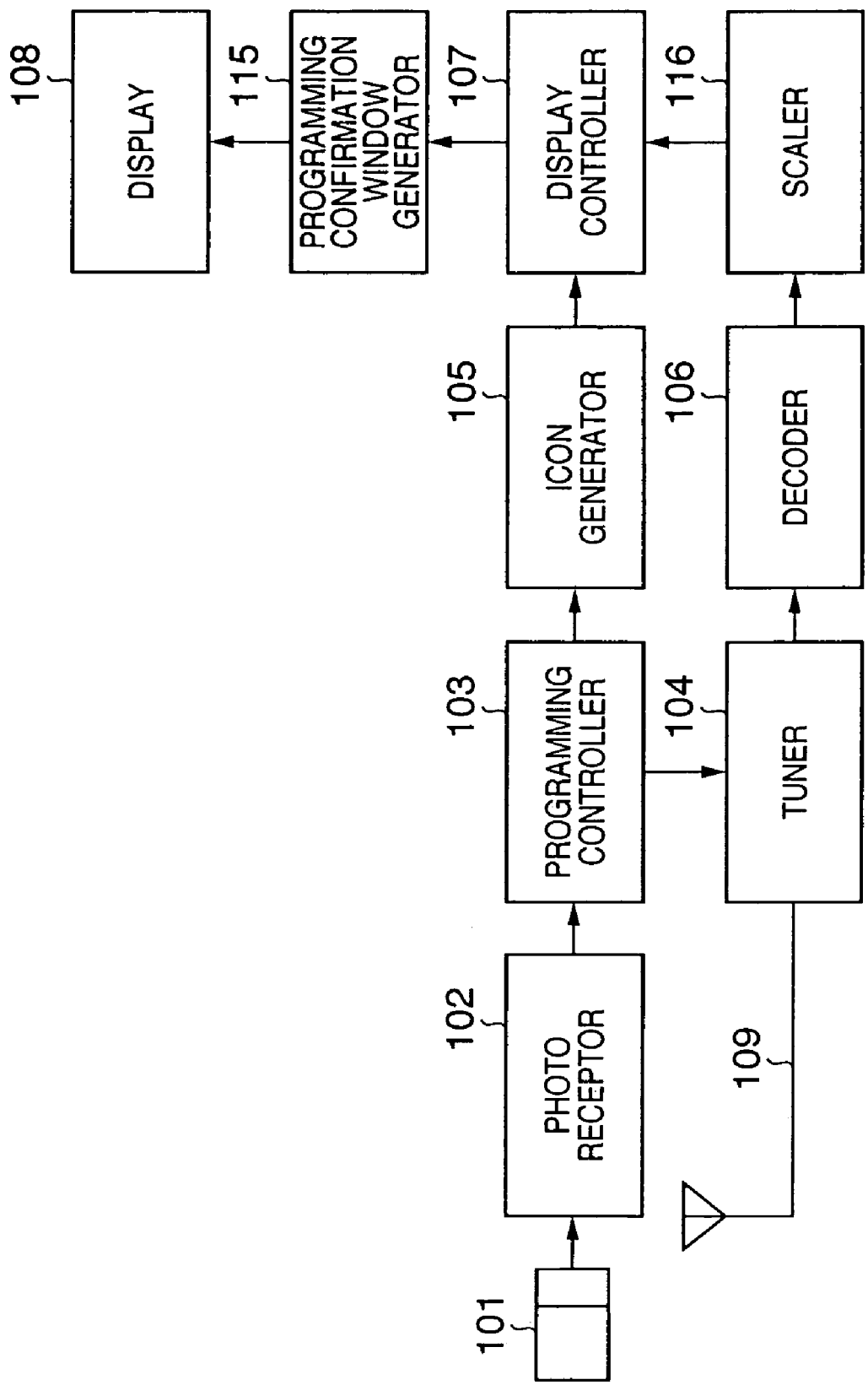
FIG. 14 is a block diagram showing the arrangement of a recording programming apparatus according to the fourth embodiment.

FIG. 14 is a block diagram showing the arrangement of a recording programming apparatus according to this embodiment. The same reference numerals as in the recording programming apparatus according to the first embodiment shown in FIG. 1 denote the same constituent elements in FIG. 14, and a description thereof will be omitted. Different constituent elements will be described below.

The recording programming apparatus shown in FIG. 14 has a programming confirmation window generator inserted between a display controller 107 and a display 108 and a scaler 116 inserted between a decoder 106 and the display controller 107.

The decoder 106 decodes received data and sends it to the scaler 116 as image data. The scaler 116 enlarges or reduces the image data in accordance with the display mode by the user instruction and sends the image data to the display controller 107.

The display controller 107 constructs the display window in accordance with the display mode by the user instruction and sends the display window to a programming confirmation window generator 115. When the display mode is a normal watching mode, the image data from the scaler 116 is directly displayed. When the display mode is a programming setting mode, display data is generated on the basis of the icon from an icon generator 105.

The programming confirmation window generator 115 generates a monthly programming confirmation window and a weekly programming confirmation window on the basis of the display data from the display controller 107.

When a programming confirmation window display instruction is input by the user, the generated programming confirmation window is sent to the display 108. When no programming confirmation window display instruction is input, the display data sent from the display controller 107 is directly sent to the display 108.

FIG. 15 is a view showing an example of the monthly programming confirmation window.

This programming confirmation window is displayed as a one-month calendar having a matrix of cells. The thumbnail image of a programming setting window shown in, e.g., FIG. 3 is displayed at a position with programming. FIG. 15 shows an example in which programming has been done for September 10 (Wed). The indicator at this portion represents that programming has been done for "12:00 p.m., 1:00 p.m., and 7:00 p.m." on September 10. The forenoon and afternoon can be distinguished by the display color of the dial or cell.

Since the display is small and simple, the user cannot know which channels are programmed. To confirm detailed programming contents, the user operates a remote control device 101 to move the cursor position shown in FIG. 15 and presses the enter key.

Accordingly, the display switches to the programming setting window of that date.

Figure 16:
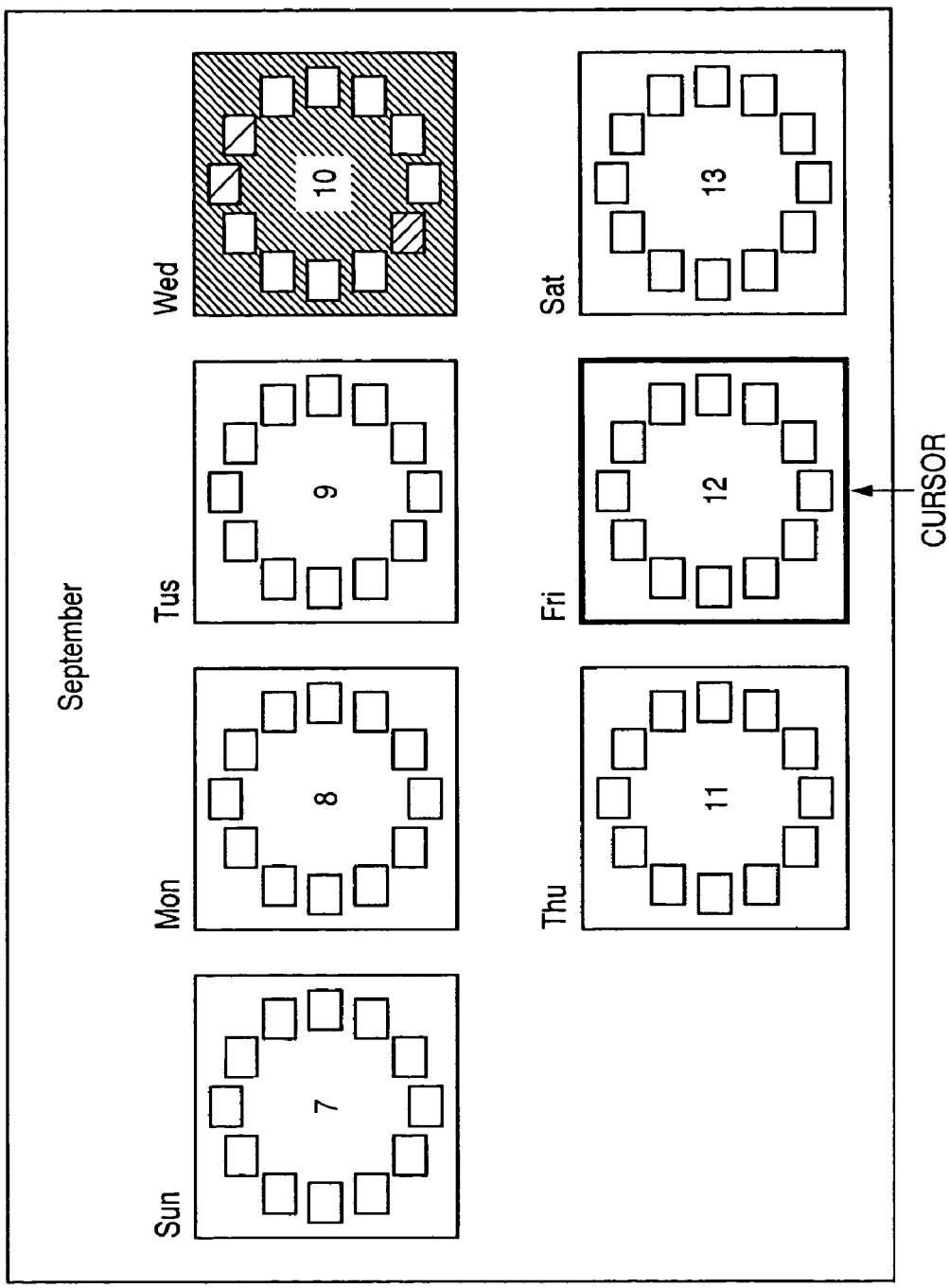
FIG. 16 is a view showing an example of a weekly programming confirmation window in the fourth embodiment.

FIG. 16 is a view showing an example of a weekly programming confirmation window.

FIG. 16 shows an example in which programming has been done for September 10 (Wed). At the portion representing "September 10", an icon generated by the programming confirmation window generator 115 on the basis of a programming setting window shown in, e.g., FIG. 3 is displayed. This icon is generated by reducing and simplifying the programming setting window. In the example shown in FIG. 16, programming has been done for "12:00 p.m., 1:00 p.m., and 7:00 p.m." on September 10. The forenoon and afternoon can be distinguished by the display color of the dial or cell.

In addition, this icon is displayed larger than in the display of the monthly programming window shown in FIG. 15. Hence, the programmed channel is also distinguished by the color for each channel, which is set by the user in advance. However, since the display is small and simple, neither the channel number nor the genre is displayed. To confirm detailed programming contents, the user operates the remote control device 101 to move the cursor position shown in FIG. 16 and presses the enter key. Accordingly, the display switches to the programming setting window of that date.

Figure 17:
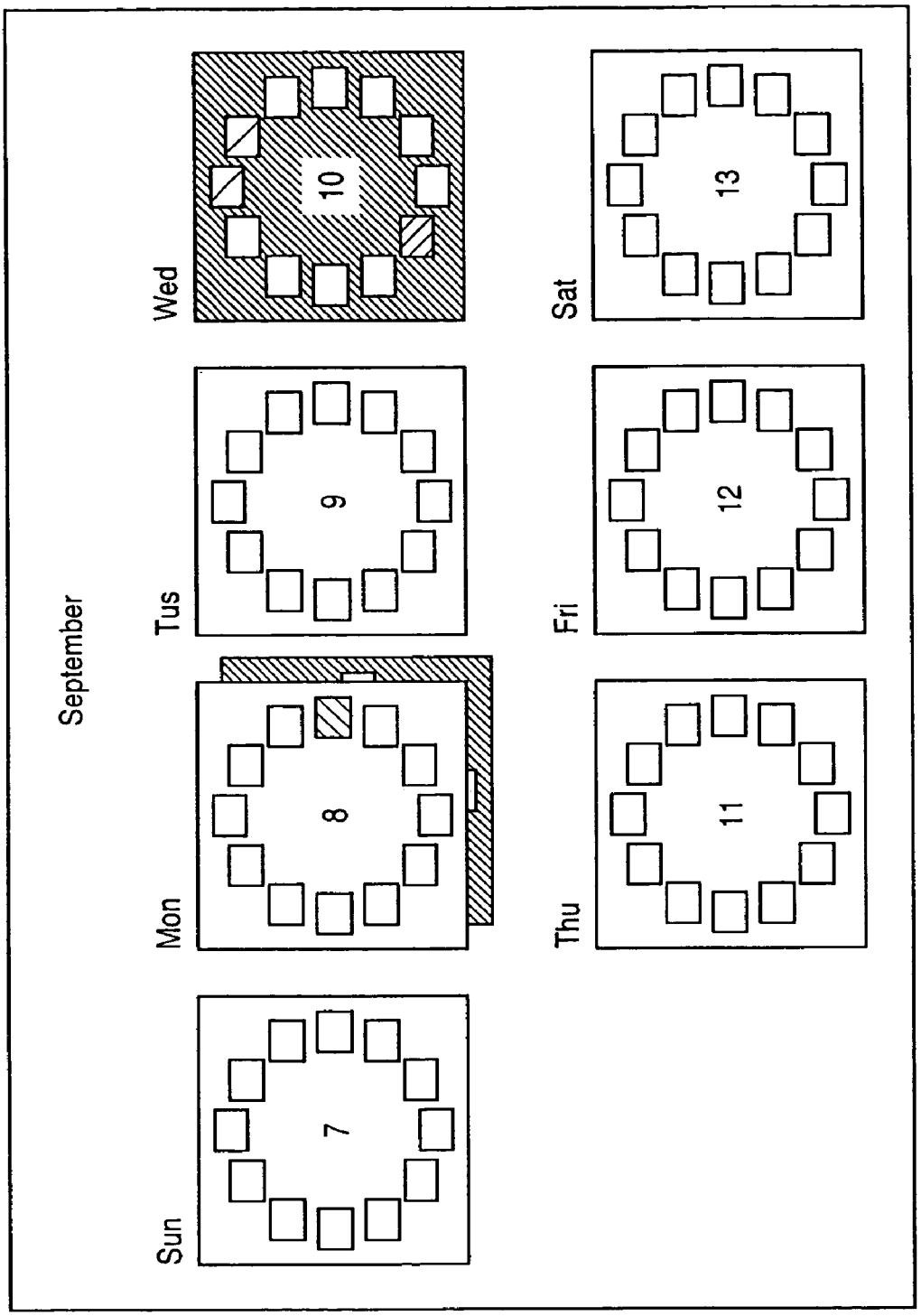
FIG. 17 is a view showing another example of the weekly programming confirmation window in the fourth embodiment.

FIG. 17 is a view showing another example of the weekly programming confirmation window.

FIG. 17 shows an example in which programming has been done for September 8 (Mon) and September 10 (Wed).

When programming of one day has been done for both the forenoon and the afternoon, an icon for the forenoon and that for the afternoon are displayed in an overlapped state, like the portion of September 8. In this case, as in FIG. 16, when the remote control device 101 is operated to move the cursor to that date, and a key operation for icon switching is executed, the icon for the forenoon or that for the afternoon can selectively be displayed.

These programming confirmation windows are effective not only in confirming the programming contents but also as an approach means to the programming setting window in executing programming setting.

Fifth Embodiment

Figure 18:
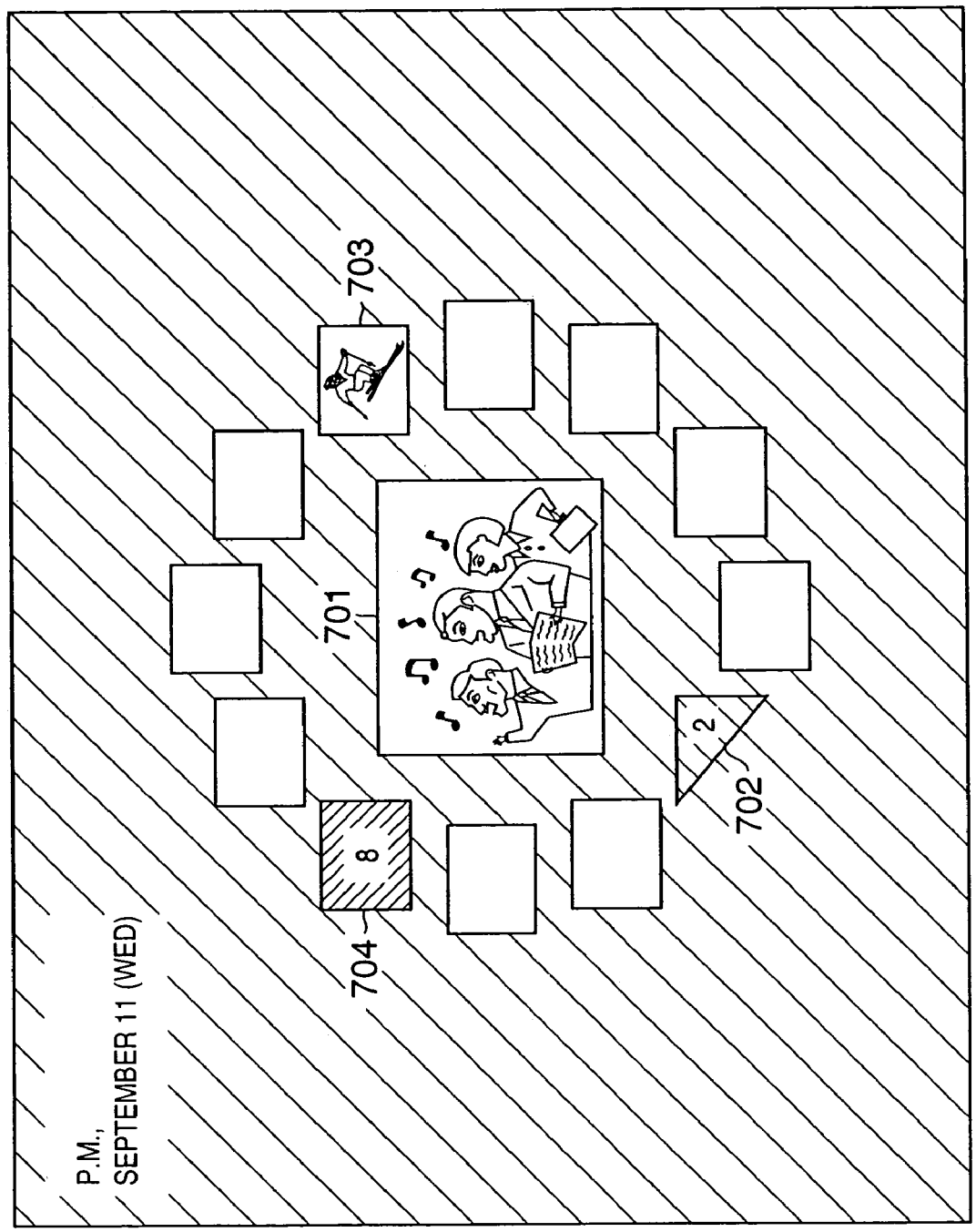
FIG. 18 is a view showing an example of a window according to the fifth embodiment in which program watching and programming confirmation can simultaneously be executed.

FIG. 18 shows an example of a window in which program watching and programming confirmation can simultaneously be executed.

Referring to FIG. 18, reference numeral 701 denotes a watching window; 702, a current time icon; 703, a recorded icon; and 704, a programmed icon.

The watching window 701 displays a program that is currently being broadcast. The watching window 701 can also display an already recorded program.

The current time icon 702 indicates the current time. Twelve icons are arranged around the watching window 701 and serve as the dial of an analog clock.

An icon at a portion corresponding to the current time has a different shape to show that the time indicated by that icon is the current time. In the example shown in FIG. 18, the current time icon indicates "7:00".

When the program displayed in the watching window 701 is a currently broadcast program, its channel number is displayed on the current time icon 702. The current time icon 702 is displayed in a color that is set by the user for each channel in advance.

When the program displayed in the watching window 701 is a recorded program, not the channel number but "Video" or the like may be displayed.

The recorded icon 703 indicates a state wherein recording has already been ended. In the example shown in FIG. 18, the recorded icon indicates that program recording scheduled at "3:00" has been ended. The thumbnail image of a scene extracted from the program is displayed on the recorded icon 703. The scene to be extracted can be set by the user in advance.

The programmed icon 704 indicates a state wherein programming has been done. Time is indicated by the position of the icon. The programmed channel is indicated by the number and display color in the icon.

In the example shown in FIG. 18, the programmed icon indicates that programming for "channel 8 at 10:00" has been done.

Sixth Embodiment

FIG. 19 is a view showing an example of a window in an index display mode. This mode can be used when a program is recorded in a storage device such as a hard disk that allows random access.

Reference numerals 801 to 812 denote index icons; 813, a mode display window; and 814, a time indicator.

The index icons 801 to 812 are generated by extracting one scene from a recorded program, causing a scaler 116 to reduce the image, and causing a display controller 107 to generate the icons. The positions of the icons correspond to the dial of an analog clock.

The indices of a program for 1 hr can be displayed in this window.

The index icon 801 indicates the image at the start of the recorded program. The index icon 802 indicates the image 5 min after the image of the index icon 801. The index icon 803 indicates the image 5 min after the image of the index icon 802. The index icons are sequentially generated at an interval of 5 min.

The mode display window 813 indicates the current display mode. Since the example shown in FIG. 19 indicates the index display mode, the mode display window indicates "index display".

The time indicator 814 rotates like a hand of an analog clock. It indicates 1 hr by one revolution, like the minute hand of a clock. The time indicator 814 is rotated by the user operation on the remote control device 101. When the time indicator 814 indicates the index icon at the position desired by the user, he/she executes the determination operation.

Then, full window display is done, and the recorded program is played back from the image of the index icon.

The time indicator 814 in FIG. 19 indicates the position after 30 min. When the determination operation is executed at this point, the recorded program is played back from the image of the index icon 807 in a full window display mode.

In this way, the user can easily execute the programming operation while watching a broadcast program or recorded program.

As has been described above, according to the present invention, a plurality of pieces of programming information can easily be confirmed independently of whether it is recording programming or on-time programming. With this arrangement, any programming error that is conventionally caused by a human error can be prevented.

OTHER EMBODIMENTS

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

What is claimed is:

1. An apparatus for scheduling to record a broadcasting program, the apparatus comprising:
   a setting unit adapted to set a recording schedule of a broadcasting program;
   a display unit adapted to display an analog clock and to display program information related to the broadcasting program at a time position of the analog clock corresponding to a broadcasting time of the broadcasting program scheduled to be recorded; and
   a control unit adapted to control said display unit so that information indicating that the recording of the broadcasting program is done is displayed at the time position of the analog clock upon executing the recording of the broadcasting program,
   wherein said display unit further displays program information related to a broadcasting program which is not yet recorded, although scheduled to be recorded, on the same screen displaying the analog clock.

2. The apparatus according to claim 1, wherein the information indicating that the recording of the broadcasting program is done comprises an image included in the recorded broadcasting program.

3. The apparatus according to claim 2, further comprising a selection unit adapted to select at least one of the recorded broadcasting programs,
   wherein said display unit further displays a plurality of images corresponding to a plurality of scenes included in the recorded broadcasting program selected by said selection unit so that the plurality of images are arranged on a dial of the analog clock.

4. A method comprising:
   a setting step of setting a recording schedule of a broadcasting program;
   a display step of displaying an analog clock and of displaying program information related to the broadcasting program at a time position of the analog clock corresponding to a broadcasting time of the broadcasting program scheduled to be recorded,
   wherein information indicating that the recording of the broadcasting program is done is displayed at the time position of the analog clock upon executing the recording of the broadcasting program, and
   wherein program information related to a broadcasting program which is not yet recorded, although scheduled to be recorded, is displayed on the same screen displaying the analog clock.

5. The method according to claim 4, wherein the information indicating that the recording of the broadcasting program is done comprises an image included in the recorded broadcasting program.

6. The method according to claim 5, further comprising a selection step of selecting at least one of the recorded broadcasting programs, wherein said display step further displays a plurality of images coffesponding to a plurality of scenes included in the recorded broadcasting program selected by said selection step so that the plurality of images are affanged on a dial of the analog clock.

7. An apparatus-executable program stored on A storage medium for effecting the method according to claim 4.

* * * * *